United States Patent

Crawford, Jr. et al.

Patent Number: 5,906,702
Date of Patent: May 25, 1999

[54] METHOD AND APPARATUS FOR REMOVING PROFILES

[75] Inventors: Curtis C. Crawford, Jr.; Nyle M. Miller; Walter E. Baldridge, all of Belleville, Kans.

[73] Assignee: Precision Dynamics Corporation, San Fernando, Calif.

[21] Appl. No.: 08/385,151

[22] Filed: Feb. 7, 1995

[51] Int. Cl.⁶ .................................................. B32B 31/00
[52] U.S. Cl. ...................... 156/251; 156/515; 156/583.1; 83/100; 83/123; 83/164
[58] Field of Search ................................ 156/270, 269, 156/251, 515, 267, 583.2, 583.1; 83/164, 98, 100, 123

[56] References Cited

U.S. PATENT DOCUMENTS

| | | | |
|---|---|---|---|
| 3,287,195 | 11/1966 | Piazze | 156/251 |
| 3,680,419 | 8/1972 | Stoop | 83/98 |
| 4,981,546 | 1/1991 | Bergevin | 156/583.2 |

*Primary Examiner*—David A. Simmons
*Assistant Examiner*—Linda L Gray
*Attorney, Agent, or Firm*—Bruce J. Clark

[57] ABSTRACT

A method for forming a plurality of holes, creating profiles, in a plurality of vinyl layers using a hollow portion of an RF sealing die and for removing the profiles from the die using a base plate punch and a removal means. The method includes providing a base plate support having a first hole for receiving the punch and a support surface, stacking the layers into a stack on the surface over the first hole where there is provided under the stack a layer of dielectric material having a receiving hole symmetrically aligned with the first hole, pressing the die through each of the layers of the stack to form the profiles received within the hollow portion of the die and to seal together portions of the layers of vinyl material which surround the outer surface of the die, sliding the punch through the first receiving holes and into the hollow portion of the die to push the profiles further into the die where the diameter of the receiving hole is substantially the same as the diameter of the punch to minimize the area between the punch and the dielectric material as the punch passes through the receiving hole and into the contact with the profiles to prevent arcing of the profiles during movement of the profiles through the die, and removing the profiles from the die using a removal means connected to the die.

5 Claims, 6 Drawing Sheets

FIG. 4 CROSS SECTION OF BASE PLATE IN DIE CLOSED POSITION

METHOD AND APPARATUS FOR REMOVING PROFILES

BACKGROUND OF INVENTION

This invention pertains to the art of removing cut out profiles of vinyl, plastic or other material. The invention is particularly useful in a system where layers of material are sealed using radio frequency, thermal or ultrasonic sealing, however it is not limited to these materials or sealing.

For example, in a radio frequency (RF) sealing system, sealing occurs by the joining of thermal plastic film or sheet materials with heat that is produced by radio frequency energy. This heating is typically done in a press containing an electrode (die) that is shaped to the configuration desired in the finished product. As in other molding processes, the variables are heat, pressure, and time. Heat is produced by the reaction of the plastic to the high frequency energy from the RF generator. The amount of heat is proportional to the amount of RF power applied and the heatability of the plastic. Often a heated platen is used to stabilize the temperature. The pressure is typically supplied by a pneumatic system and is varied by changing the air pressure in the pneumatic: system. Time is controlled by electric timer built into the machine.

Typical machines include a pre-seal timer to allow full pressure of the electrode against the material before the RF power is applied. A heat or seal timer controls the length of the RF power cycle. A dwell or cool timer is used to allow the material to cool and set while pressure is still applied.

Figure 5A:
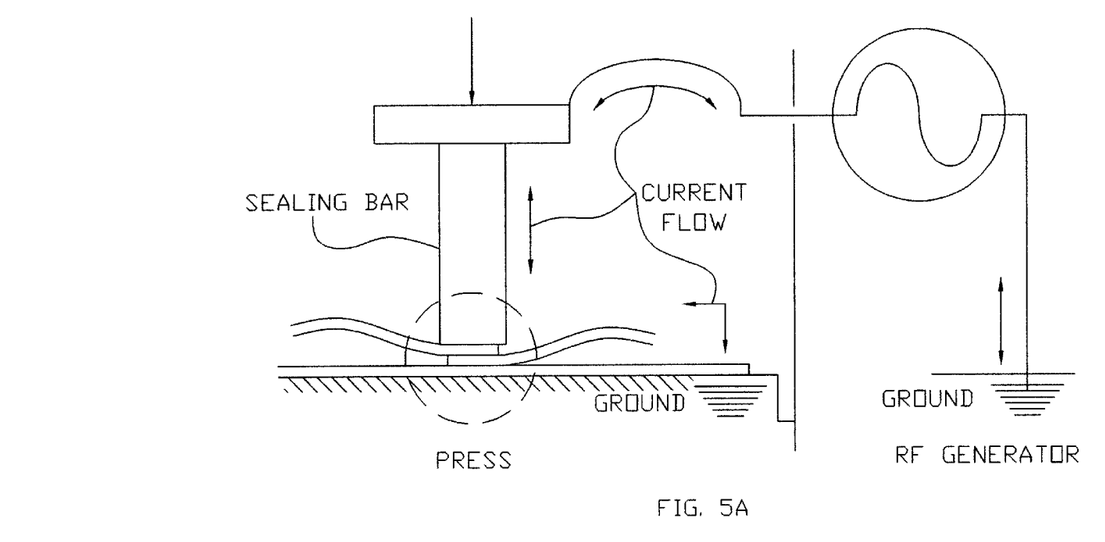
FIG. 5a shows the typical RF sealing where no punching occurs.
Figure 5B:
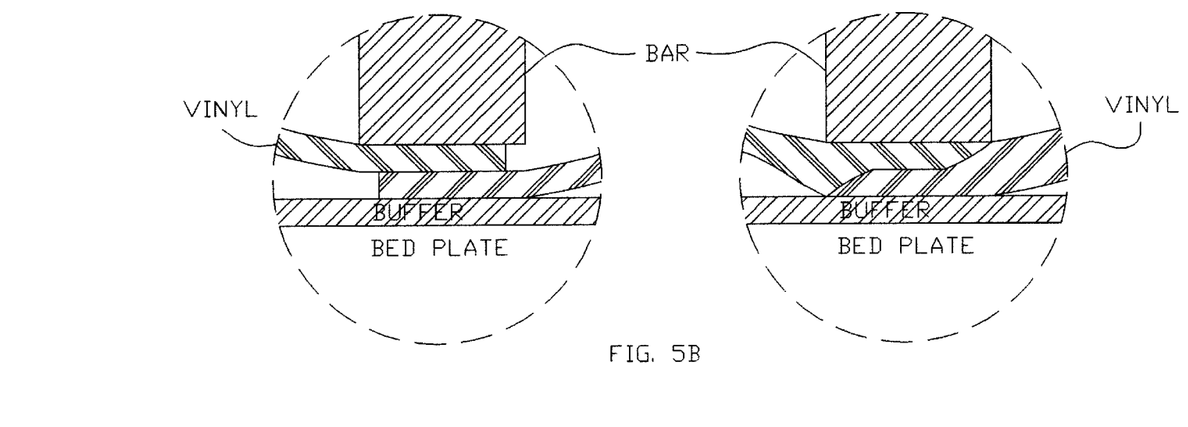
FIG. 5b shows a close up of the RF sealing method utilizing the buffer.
Figure 6:
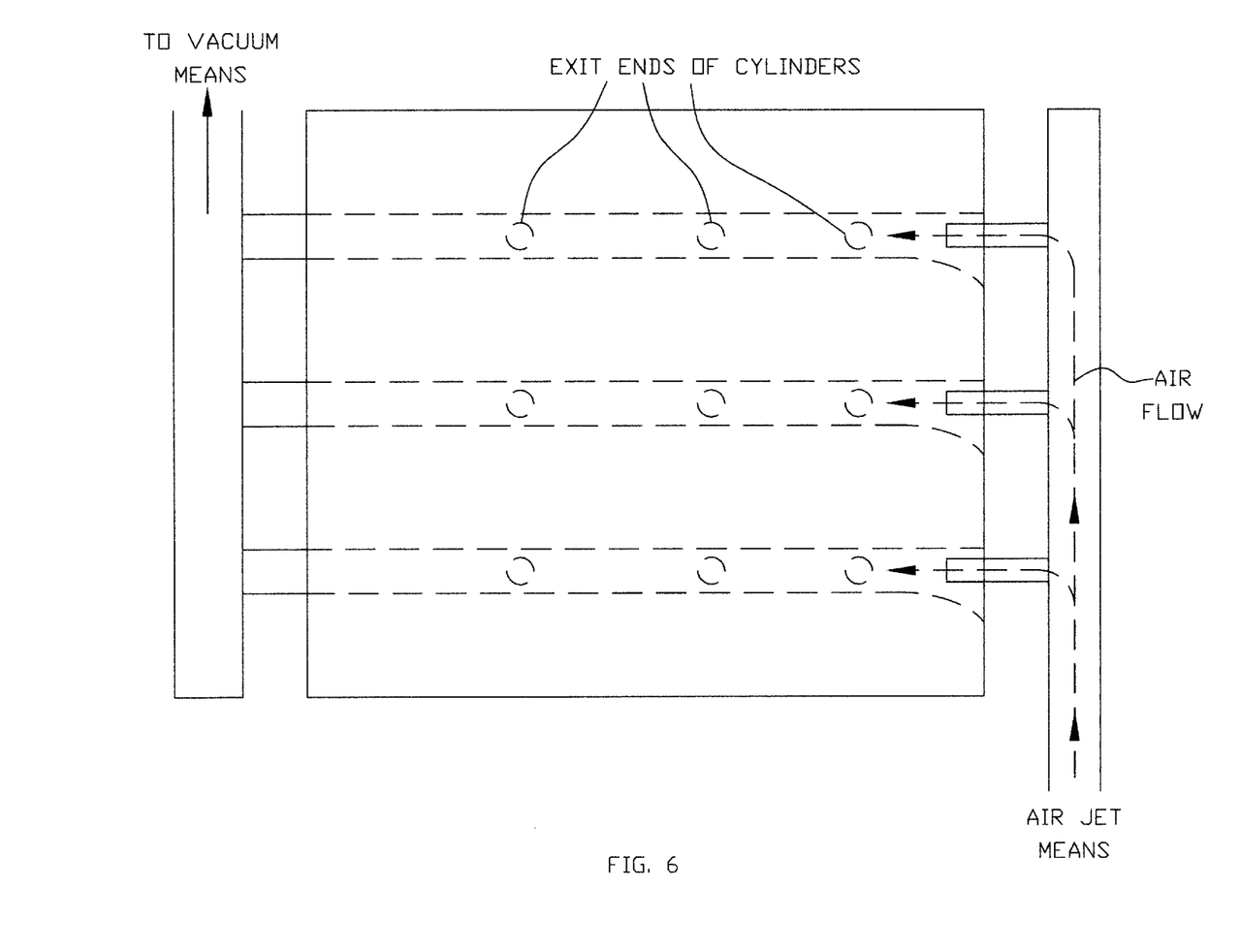
FIG. 6 is a top view of the plenum in the preferred mode.

In the RF sealing process, shown in FIG. 5a, the sealing bar and the ground are separated by a buffer (FIG. 5b), both of which are electrically conducting. The press is electrically connected to the ground of the RF frequency generator. The RF signal is applied between the sealing bar and the ground. It is seen then that a requirement is that the sealing bar and ground be electrically separated else a short is created and the system fails. A buffer is used to enhance the RF sealing process preventing loss of heat, requiring less power, helping to prevent; arcing due to over sealing, concentrating heat and eliminates the sticking of materials.

In a system where the sealing bar seals two or more materials together in a contiguous seal, and where profile created by seal, is to be punched out, it is necessary in the prior art to first seal the materials using the RF method, then in a later step in the process punch the hole using the typical hole punch and in a still final step, remove the insert (sometimes referred to as a "cut out", "hole", "dot", or "profile"). Some unconventional systems use vacuum removal but because of the size of the vacuum needed, and because of the nature of a punching system having a plurality of holes allowing for vacuum leaks, such a system is often impractical and uneconomical.

Consequently, it is an object of this invention to remove profiles cleanly and economically. It is further an object to combine the sealing, punching, and profile removing steps into the production line of the aforementioned sealing processes, and to do so economically, and in an RF system to do so without arcing.

To do so during the process requires that the punch fit inside the sealing electrode die. However the resulting gap can still be problematic in that air gap arcing often occurs effectively shorting the RF circuit resulting in a lack of sealing and other problems.

One method used is to allow the profiles to build up inside the receiving RF sealing cylinder, which cylinder directs the profile to a hole in the side of the cylinder for the profiles to eventually fall out; however in such a system, the profiles don't always fall out and will sometimes jam up. Moreover, the profiles that do fall out the side fall onto the material and work surface area.

The invention is directed primarily to achieving these objectives in a system utilizing a plurality of hole punches in an RF sealing process so as to punch at one time a plurality of holes at the time the RF sealing die is still pressed against the materials. The invention apparatus in one form is comprised of a die being the RF electrode, which die has therein a plurality of cylinders for receiving the base punches. The cylinders are connected to a plenum having both an air jet to create high speed airflow over the hole, and a vacuum so as to remove the profiles upon punching following the RF sealing. During the RF sealing process, a thin moving secondary disposable buffer is introduced, not static, to fine tune an existing buffer system, such as a reusable thicker buffer. The buffer is comprised of a dielectric or other insulating material, usually paper, so as to block the punch/electrode gap and prevent the arcing that otherwise might occur.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENT

Figure 1:
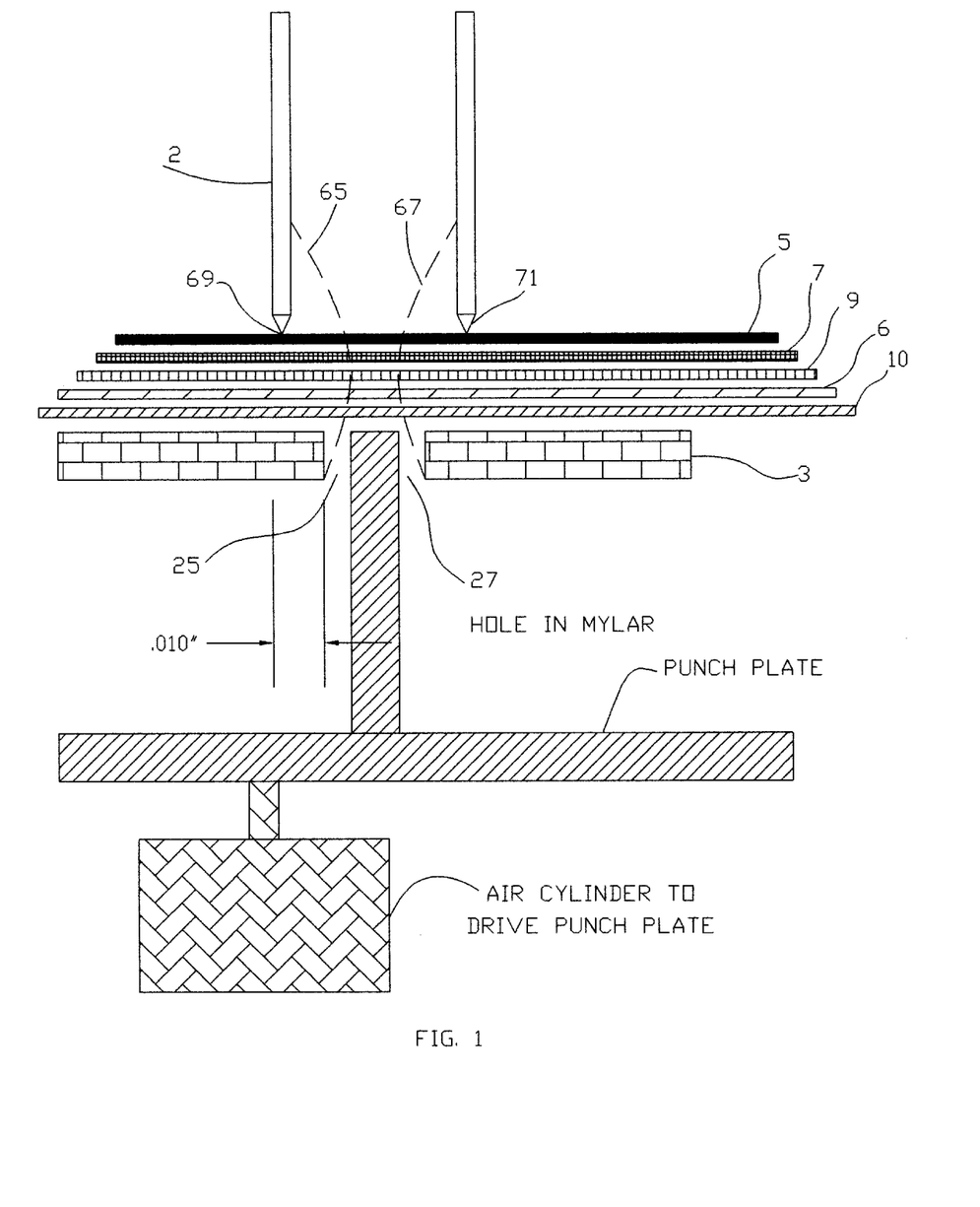
FIG. 1 is a description of the apparatus for a single RF seal cylinder prior to punching.
Figure 2A:
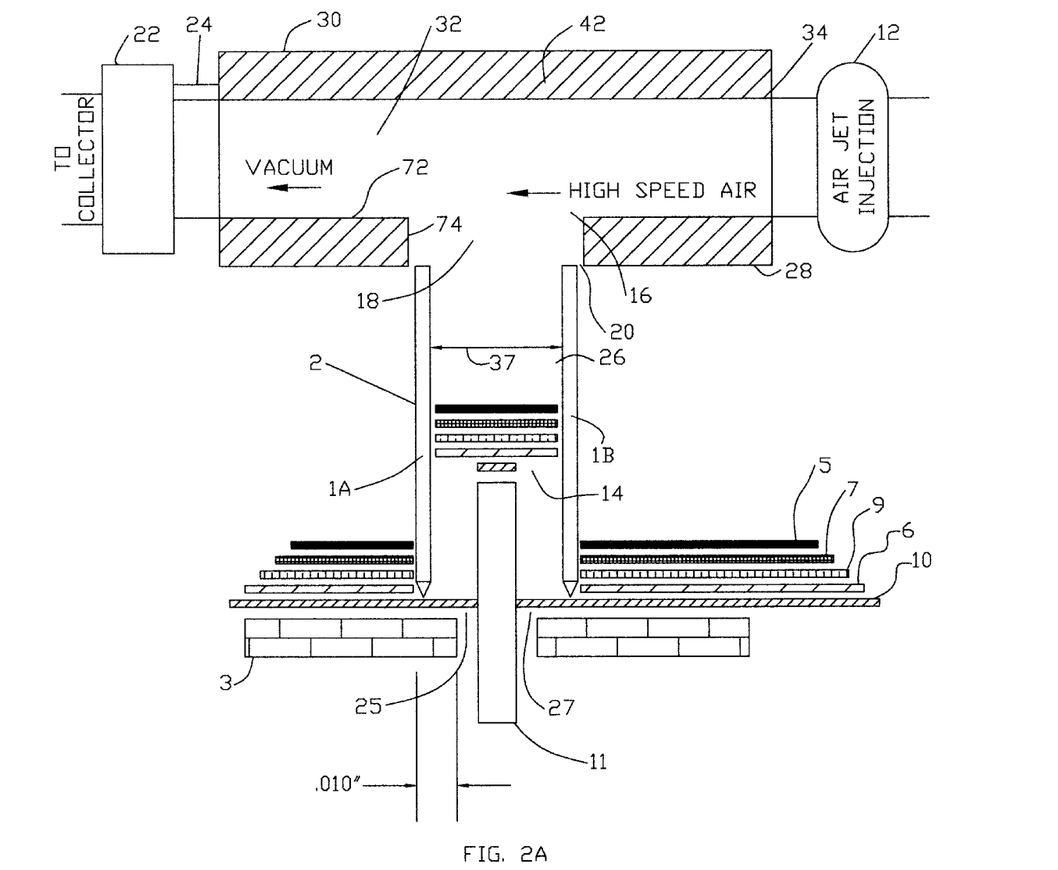
FIG. 2a is a description of the apparatus for single RF cylinder during punchings.

The preferred mode utilizes the invention in an RF sealing system. FIG. 1 shows a side view of one typical cylinder and sealing punch before punching. FIG. 2a shows the punch in progress. The cylinder 2 has opposing walls 1a and 1b of the typical upper seal die cavity having a plurality of these cylinders. This die cavity is electrically conductive and connected electrically to the RF signal generator. The other electrical connection from the generator, typically the ground, is connected to the lower base plate 3. Vinyl 5, is to be joined with vinyl 7 and vinyl 9. In the preferred mode, each of these materials is typically one long sheet or webbing of material fed to the machine via a series of guides and rollers.

The lower base plate punch 11 is typically physically part of the base plate. The punch itself could operate independently and need not be electrically conductive. FIG. 1 shows the punch and base plate connected; FIG. 2 shows them independent.

Further describing the preferred embodiment of the apparatus, the lower base plate has therein the sufficient hole or gap 25, 27 to allow the base plate punch to enter and exit as it punches the material. The size of the base plate punch hole is smaller than the interior diameter 37 of the cylinder and should be as small as possible relative to the diameter 37 sufficient to allow the punch to lift the profile without the profile jamming or falling off sideways. Any larger increases the likelihood of arcing. The diameter of the lower base plate punch 11 is preferably no more than 0.01" smaller than the upper seal die cylinder diameter 37. The primary buffer has an opening for the punch 11 that is normally of a slightly larger size than that of the new hole punched into the secondary buffer 6.

The lower base plate 3 is electrically connected to the ground of the typical RF system. Undesirable arcing occurs at gaps 25 and 27 in FIG. 1 between the die 2 and the base 3. These arcs, shown as dotted lines 65, 67, can occur absent the existence of a primary and/or secondary buffer 10 and 6 during RF sealing when the die edges 69 and 71 settle into the vinyl materials 5, 7, 9, and nears the electrical ground of the base 3. The die edges 69 and 71 are typically beveled to knife edge and allow the forming of a tear seal. (A seal sufficient to allow for tearing or punching out of the profile). The die stays down (closed) after sealing to hold the material taut during punchout.

In systems having arc suppression capability, sensing of the arc shuts down the system, but usually before the seal is complete. Whether the arc occurs is not only dependent on such factors as the power of the RF generated, the distance between the die 2 and base 3 at point 69, the existence of an open air gap 25, the size of the gap 25, whether any dielectric buffer is in place, the thickness of the buffer, and other factors. Creating a gap, increasing the gap size, decreasing the distance between the die and base at 69 or 71, increasing the power, decreasing the dielectric or insulating capability of the material between the base and die, or decreasing the dielectric or insulating capability of any primary buffer 10, or any one of the foregoing factors, can substantially increase the likelihood of arcing.

Consequently a dielectric buffer is used. Here a dual buffer system is disclosed. A primary buffer 10, preferably MYLAR or other buffer material, is shown stationary and situated between tie lower base plate 3 and the secondary buffer 6. The typical buffer is comprised of an electrical and/or thermal insulating material and include phenolic (BAKELIGHT), MYLAR sheet and tape, TEFLON sheet, and tape, fish paper, glass cloth silicon release paper, and others that are known in the art. The type and thickness of the primary buffer is determined by that necessary to prevent arcing under the particular sealing and punching requirements and conditions during sealing, and in combination with the secondary buffer 6 in place. The primary buffer is static or otherwise reusable, such as a circuitous continuous web. For example, the primary buffer in the preferred mode is comprised of MYLAR having a thickness of 14 mils, while the paper secondary buffer has a thickness of 4 mils.

The secondary buffer is thin, relative to the primary buffer, is discardable and is intended to "fine tune" the buffer system so as to provide a fresh new buffer on each cycle of the press to provide a controlled and tighter buffer fit around the punch, blocking the gaps 25 and 27 around the punch and thus buffering for the particular system, further enhancing the effect of the buffer. Moreover, the secondary buffer does so in a cost effective manner inasmuch as the secondary buffer is usually thin and relatively inexpensive paper. In the preferred mode the secondary buffer is comprised of paper having the side facing the vinyl relatively nonfibrous, smooth, preferably glossy. Buffer paper having a polycoated side is one type, for example. It is significant that the paper be of a sufficient type or finish to allow for a clean cut upon punching, without significant fibrous rough edges.

This secondary buffer is typically fed through the process in line via its roller system with vinyl materials 5, 7, 9 and preferably adjacent the material 9 furthest from sealing punch. In the preferred mode the secondary buffer moves at the same rate as the vinyl web.

The plenum is comprised of an upper plenum portion 30 and a lower plenum portion 28. The lower plenum has an opening 18, preferably equal to or slightly larger than the interior diameter 37 of the cylinder 2, although it is only necessary it be as large as is necessary to allow the profile to pass through without jamming. The interior of the walls 74 opening 18, like that of the cylinder walls 26 are finely smoothed and polished, particularly when working with vinyl profiles, to avoid jamming.

The upper plenum has an upper solid portion and an opening or cavity (upper plenum cavity) 32 from one end 34 to the other end 24 into which the opening 18 joins. The walls 42 are likewise smooth, preferably microfinished.

Air jet means 12 introduces high velocity gaseous, including air, (relative to the vacuum air speed) so as to create a venturi effect at the juncture of openings 32 and 18. The high velocity (sometimes referred to as high speed air) is directed approximately perpendicular to the direction of air flow out of the cylinder, and in a direction toward the vacuum end of the plenum. Approximately means at a direction sufficient to create the venturi effect. The air jet source comes typically from a 120 psi air compressor system commonly available. Consequently lower atmospheric pressure occurs at said juncture 16 relative to the atmospheric pressure below the profile 14 so as to provide "lift" assist to remove the profile into the cavity 32. The air jet means likewise provides force to move the profile towards the vacuum means 22 to allow removal of the profile to the collector or trash bin for disposal. Use of the vacuum, without the air jet, is less thorough and allows for reduced vacuum effect if leaks occur in the die, i.e., the vacuum pressure decreases substantially as each cylinder throughout the cavity opens as each profile is removed, leaving little vacuum for any remaining "jammed" profiles. Consequently the air jet means provides independent means to assist in the removal of the profile.

Figure 2B:
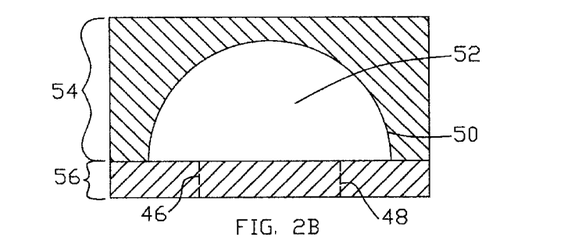
FIG. 2b is an end view of the plenum.

FIG. 2b shows the plenum from an end view. The opening in the lower plenum 28 is shown having its walls 46, 48, and joined to the channel 52 in the upper plenum 30. The channel 52 is the end view of the cavity 32 in FIG. 2a. The channel 52 is shown in the preferred mode having a semicircle or somewhat rounded edge 50 to further enhance passage of the profile.

The process is comprised of first selecting the primary buffer consistent with the needs and requirements of the materials and the system during the particular daily or periodic sealing and punching process involved. For the particular vinyl materials to be joined, the primary buffer is selected, in the preferred mode, to be of a sufficient thickness so as to provide most of the buffering, i.e., insulating, requirements so as to normally allow for the seal. Holes are punched or otherwise created in the primary buffer consistent in size and shape to the holes in the base, so as to allow the punch to penetrate the base and the primary buffer. Primary buffer holes are usually smaller than the diameter or size of the base hole and are punched so as to approach as close as possible the size of the penetrating punch. There is still the remaining gap to fine tune the system and fill the remaining gap, the secondary buffer is then inserted as discussed hereafter. The primary buffer is secured on the base plate so as to match the corresponding holes of the primary buffer with the base plate. The vinyl web and secondary buffer are then fed while repeatedly sealing and then punching the material. The primary buffer is then replaced as needed. The primary buffer is often replaced depending on the job, the wear, the types of holes needed, the amount of arcing, or other factors peculiar to the particular job and sealing process.

During the punching process, the materials to be sealed, in combination with the secondary buffer, are inserted between the sealing die and base plate, at which time the sealing die 2 closes onto the vinyl material to the sufficient depth required to complete the seal create the profile. In an RF system, the RF power is turned on during this process sufficient to create the seal. While the seal die is in the closed position, and after the RF power is turned off, the punch 11 penetrates first through the secondary buffer then the vinyl material creating the cut out profile 14. The cut out profile is then removed using removal means. In actual use, when the die closes, a pre-seal timer allows for settling of the die into the material, a seal timer then allows for the specific seal time during which the RF power is generated. A separate timer then allows for a timed delay for cooling and setting of the material prior to punch, following which the punch and vacuum and air jet system is turned on, the punch is then retracted, the press (die) opens, the vacuum/air jet system turns off and the material is removed and new material is inserted. As an additional step, the sealing die is first preheated and stabilized at an operating temperature prior to the first seal and maintained at that temperature throughout the repeated seal and punch processes so as to shorten, enhance and improve the sealing.

The removal means and process involves the use of the air jet means 12 and the vacuum source 22. The air jet injects high speed air across the exit end of the cylinder 2 as it is extended by the hole 18. The air is driven in a direction perpendicular to the imaginary planer surface of the exit end at 16 where the imaginary planer surface is located at 16 and parallel with the surface 72. This high speed air is essentially perpendicular to the direction of air flow out of the cylinder 18. The air jet blows the profile in a direction towards the vacuum source and the vacuum then removes the cut out profile.

In use in a sealing system, the air jet means and the vacuum means are cycled off and on so that they are off during the sealing. In this manner, the air flows do not interfere with the heat transfer during the sealing process.

Figure 3:
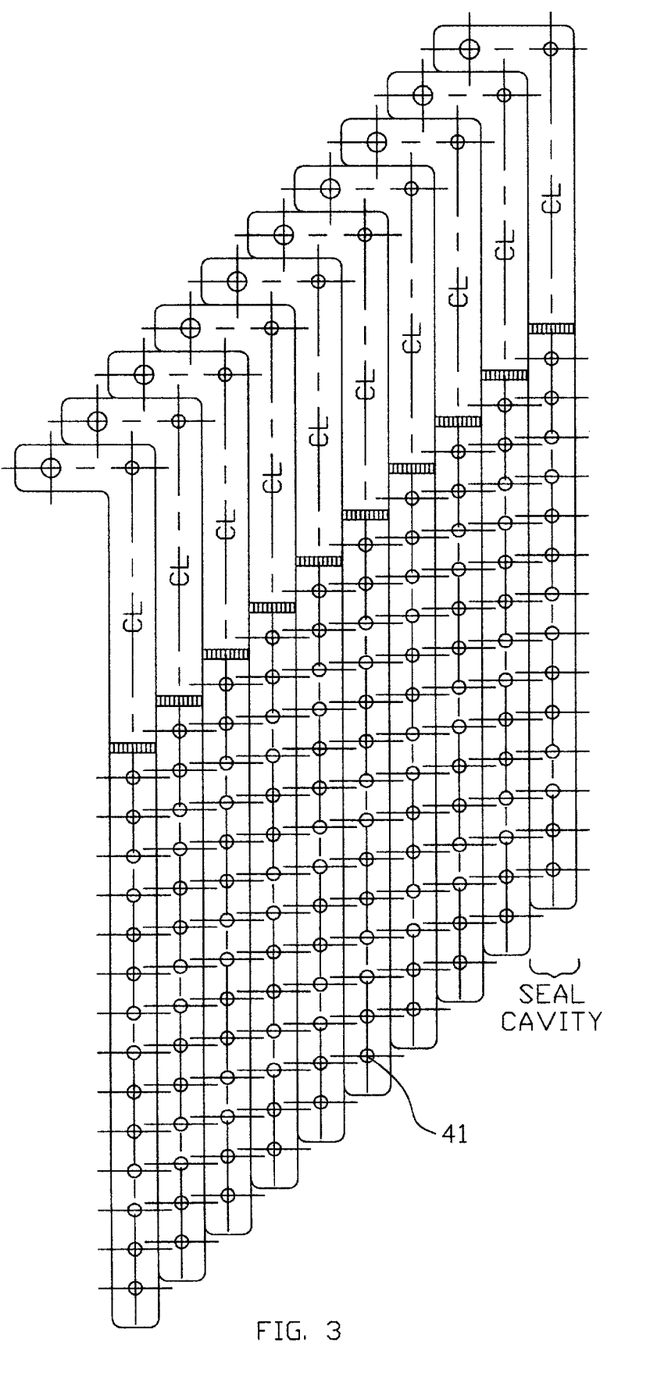
FIG. 3 is a typical die or electrode using a plurality of the RF seals and cylinders.
Figure 4:
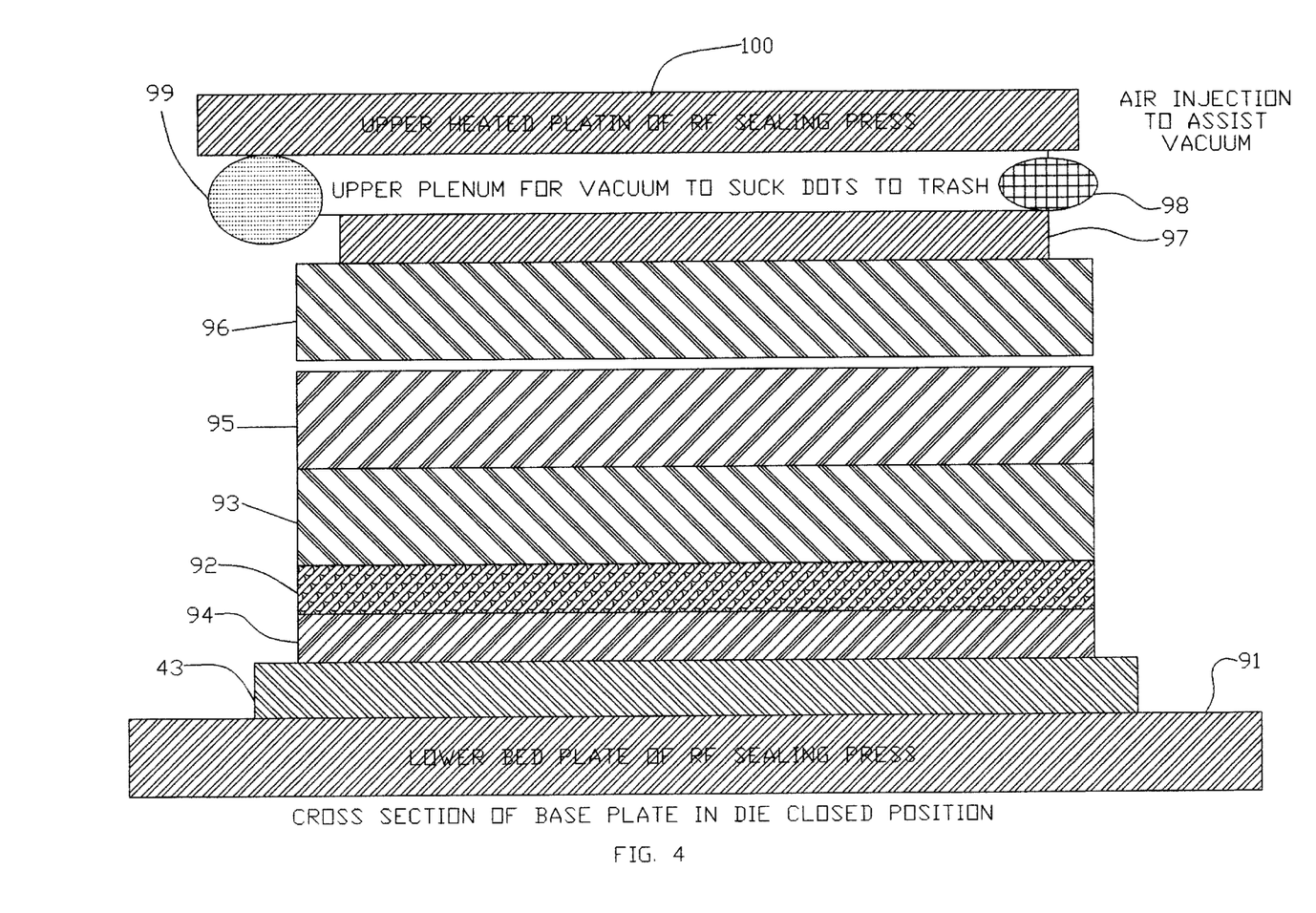
FIG. 4 is a side view of an industrial system utilizing plates having therein a plurality of RF sealing and punching apparatus.

FIG. 3 shows the arrangement of a typical die having a plurality of cylinders like the single cylinder shown in FIG. 1. Each cylinder such as that shown as 41 in FIG. 3 is repeated throughout to create the upper sealing die shown in FIG. 4. FIG. 4 shows a side view of the method and apparatus utilizing parts having a plurality of punches and cylinders. The lower base plate assembly 43 contains the lower base plate and the punch plate containing the punches. It sits on a lower bed plate 91. Adjacent the lower base plate assembly is the primary buffer 94, the secondary buffer 92, the plurality of vinyl web 93, 95, 96 and the upper seal die 97 contains the upper seal cylinders. The air injection means is introduced into the plenum via perpendicular manifold 98 and then introduced to the plenum holes thereafter. The vacuum means 99 are shown on the opposing side of the upper plenum. Above that is shown an upper heated platen 100 discussed earlier.

Thus it can be seen that an apparatus and method are shown for quickly and economically sealing, punching, removing and disposing of profiles in a controlled manner. Any remaining profiles, if any, can be easily brushed off as they exit the die area. The positions of the base and die shown in FIG. 2*a* could be reversed. It should be understood also that heat sealing includes all forms, including, thermal and electric, (Radio Frequency and ultrasonic).

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

We claim:

1. A method for forming a plurality of holes, creating profiles, in a plurality of vinyl layers using a hollow portion of an RF sealing die and for removing the profiles from the die using a base plate punch and a removal means, said method comprising the following steps:

providing a base plate support having a first hole therein for receiving the punch and having a support surface, stacking the layers on the support surface to form a stack where the stack is over the first hole and where there is provided under the stack a layer of dielectric material having a receiving hole where the first hole and the receiving hole are symmetrically aligned, pressing the die through each of the layers of the stack to form the plurality of profiles received within the hollow portion of the die and to seal together portions of the layers of vinyl material which surround the outer surface of the die, sliding the punch through the first hole, through the receiving hole, and into the hollow portion of the die to push the profiles further into the die where the diameter of the receiving hole is substantially the same as the diameter of the punch to minimize the area between the punch and the dielectric material as the punch passes through the receiving hole and into the contact with the profiles to prevent arcing of the profiles during movement of the profiles through the die, and removing the profiles from the die using a removal means connected to the die.

2. A method for forming a plurality of holes, creating profiles, in a plurality of vinyl layers using in a hollow portion of a plurality of RF sealing dies and for removing the profiles from the dies using a plurality of base plate punches and a removal means, said method comprising the following steps:

providing a base plate support having a plurality of first holes therein for receiving the punches, with one of the punches per one of the first holes, and having a support surface, providing a layer of dielectric material, cutting a plurality of receiving holes in the layer of dielectric material, and securing the layer of dielectric material to the support surface where the plurality of first holes are aligned with the plurality of second holes, with one of the first holes per one of the receiving holes, stacking the layers on the support surface to form a stack where the stack is over the first hole where there is provided under the stack a buffer layer between the stack and the layer of dielectric material, pressing the dies only through each of the layers of the stack to form the plurality of profiles received within the hollow portions of the dies and to seal together portions of the layers of vinyl material which surround the outer surface of the dies, sliding the punches through the first holes, through the receiving holes, through the buffer layer, and into the hollow portion of the dies to push the profiles further into the dies where the diameter of the receiving holes is substantially the same as the diameter of the punches to minimize the area between the punches that the dielectric material as the punches passes through the receiving holes and into the contact with the profiles to prevent arcing of the profiles during movement of the profiles through the dies, removing the profiles from the dies using a removal means connected to the dies, and repeating the preceding steps using a second stack of layers of vinyl material where the buffer layer is replaced.

3. The method of claim 2 where the buffer layer is relatively thin in thickness compared to the thickness of the dielectric layer.

4. The method of claim 2 where the buffer layer has at least one smooth side adjacent the stack.

5. The method of claim 2 where the dielectric layer is of a thickness such that the dielectric layer and the buffer layer in combination allow the buffer layer to be sufficiently thin to provide insulating properties.

* * * * *